United States Patent

[11] 3,530,892

[72] Inventors Herbert Charlop
Brooklyn;
Anthony J. Rotolico, Hauppauge, New York

[21] Appl. No. 713,349
[22] Filed March 15, 1968
[45] Patented Sept. 29, 1970
[73] Assignee Metco Inc.
Westbury, New York
a corporation of New Jersey

[54] CYLINDRICAL VALVE PLUG
10 Claims, 5 Drawing Figs.

[52] U.S. Cl. .......... 137/625.19, 251/174, 251/288
[51] Int. Cl. .......... F16k 19/00
[50] Field of Search .......... 137/625.19; 251/174, 288

[56] References Cited

UNITED STATES PATENTS

| | | | |
|---|---|---|---|
| 2,665,107 | 1/1954 | Blackford .......... | 251/288X |
| 2,961,335 | 11/1960 | Shepard .......... | 117/105 |
| 3,108,614 | 10/1963 | Navara .......... | 137/625.19X |
| 3,154,094 | 10/1964 | Bredtschneider et al. .... | 251/174X |

FOREIGN PATENTS

| | | | |
|---|---|---|---|
| 1,261,787 | 4/1961 | France .......... | 137/625.19 |

*Primary Examiner*—Robert R. Mackey
*Attorney*—Burgess, Dinklage and Sprung

ABSTRACT: A plug valve for a flame spray gun having a cylindrical valve core rotatably mounted in a housing which is provided with inlet and outlet gas flow passages leading to and from the cylindrical core in order to provide a seal. The core is provided with a primary cylindrical flow orifice of substantially uniform diameter, at least one secondary smaller cylindrical bleed orifice of substantially uniform diameter, and at least one third cylindrical bleed orifice of substantially uniform diameter extending between the primary and secondary orifices.

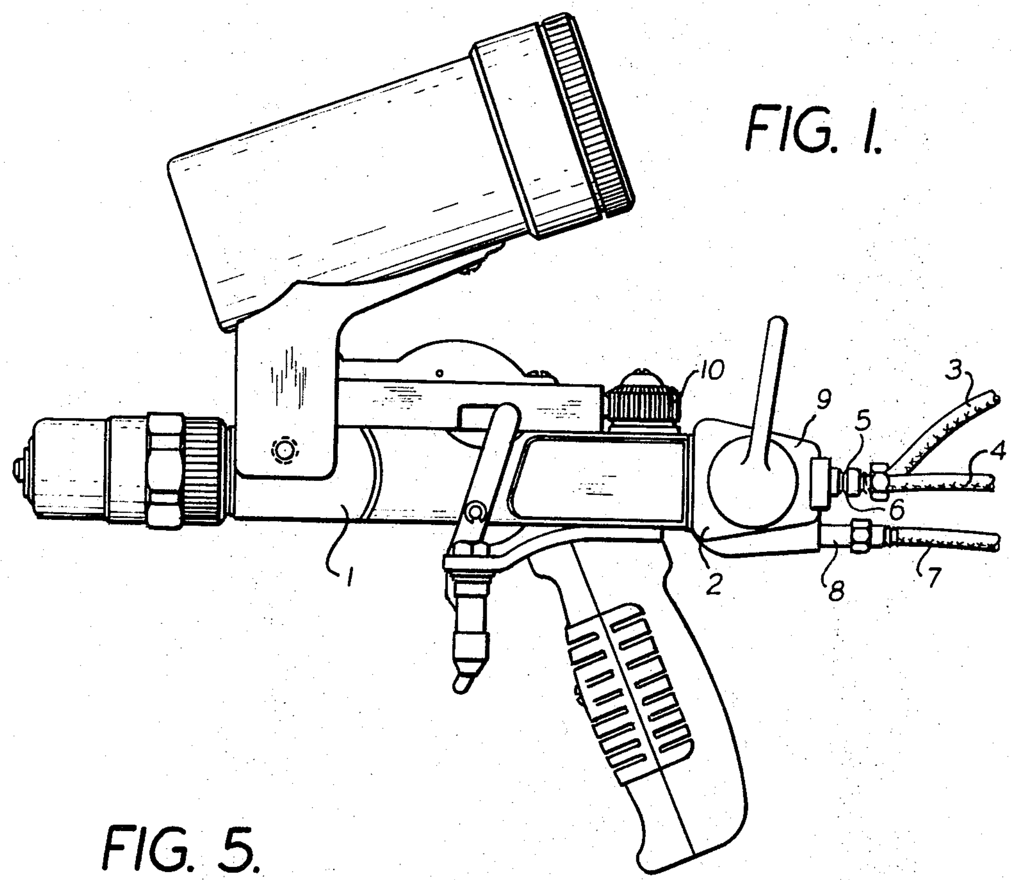
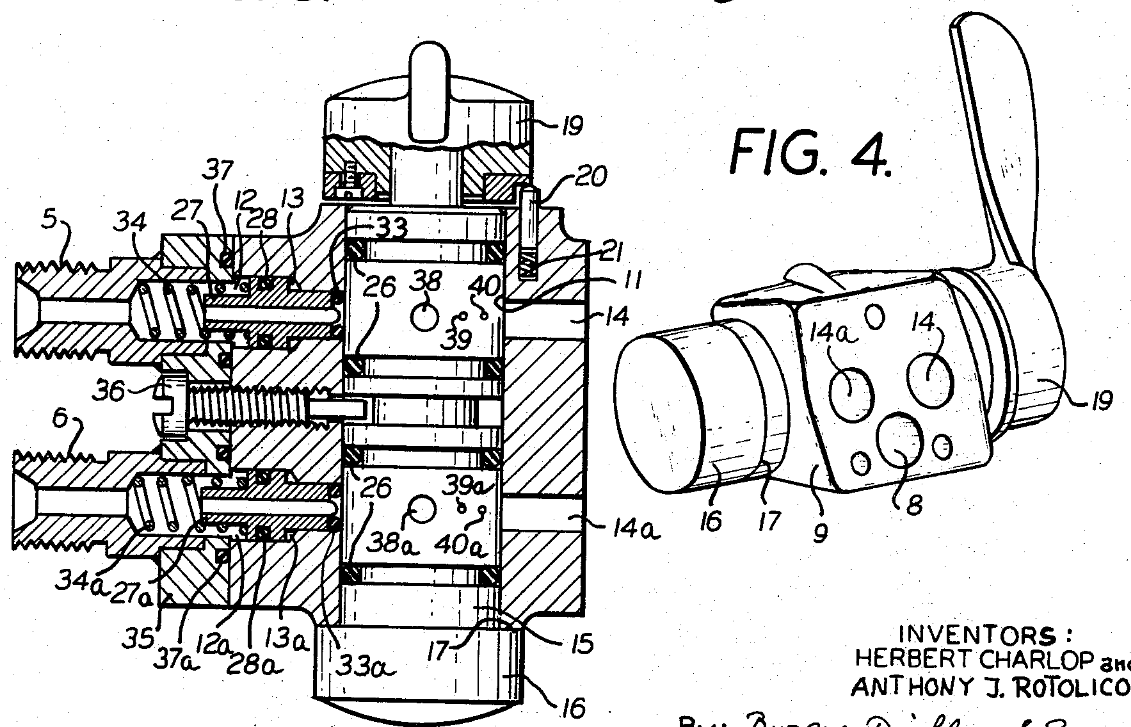
INVENTORS:
HERBERT CHARLOP and
ANTHONY J. ROTOLICO
By: Burgess, Dinklage & Sprung
ATTORNEYS.

INVENTORS:
HERBERT CHARLOP and
ANTHONY J. ROTOLICO
By: Burgess, Dinklage & Sprung
ATTORNEYS.

CYLINDRICAL VALVE PLUG

In each of the gas flow passages a primary flow orifice extends through the valve core communicating the inlet and outlet ends of the gas flow passage in one position of rotation of the valve core, and at least one secondary smaller bleed orifice communicates the inlet and outlet ends of the gas flow passage in a different position of rotation of the valve core. The gas flow orifices are positioned with respect to each other to establish continued gas flow therethrough as the valve core is rotated from a position registering the gas inlet end of the gas flow passage with the secondary flow orifice to a position registering the inlet end of the gas flow passage with the primary gas flow orifice. Actual physical proportions of the valve may require the secondary gas flow orifice to be in the form of two (or more) orifices, one extending at an angle of about 45° to the first orifice and the other extending between the first and second orifice, the intermediate orifice being to prevent a blind spot as the valve core is rotated to register the first orifice. The valve core is furthermore rotatable to a position blocking gas flow communication through the gas flow passage.

This invention relates to a cylindrical plug valve. The invention more particularly relates to a cylindrical plug valve for controlling gas flow through a flame spray gun. Flame spray guns are generally operated using a supply of a fuel gas, such as propane or acetylene, and an oxidizing gas such as air or oxygen. Additionally, particularly in connection with wire type guns, a third gas supply, *i.e.*, a blast gas, such as air, is provided.

Flame spray guns have conventionally been provided with plug valves in order to control the gas flow. It is conventional to provide a single plug valve, as for example, a tapered plug valve with sufficient orifices or ports to control the various gases. Thus, the valve may be provided with two side-by-side ports for controlling the fuel and oxidizing gases, or three side-by-side ports for controlling the fuel, oxidizing and blast gases. In order to initially light a flame spray gun, it is generally necessary to provide a reduced flow of the oxidizing and fuel gases, and it has generally been considered desirable to control this reduced flow so that the resulting mixture is rich in the fuel gas. In order to provide for this reduced flow in the lighting operation, it has been conventional practice to cut grooves known as bleeders of various sizes in the plug member of the plug valve, so that as the plug is rotated, the various gases start to flow at low flow rates and gradually increase their flow rates in proper proportion to maintain combustion after lighting. With such a plug valve it is common procedure to first turn the plug valve to full open position so as to purge the gas flow lines of any air which may have inadvertently leaked in, and then to partially close the plug valve to a position where the bleeders permit a very small flow of combustible gas and combustion supporting gas in such a proportion that the mixture is rich in the combustilble gas, *i.e.* the fuel gas, and at this point to light the gun, as for example, by means of a spark lighter. After lighting, the valve is turned to the full open position and during this period of rotation, the bleeder construction permits gradual increase in flow of the gases up to the full open position.

The conventional plug valves, particularly with respect to the bleeder grooves, have presented difficulties in production, making complete mechanization in the construction of this valve extremely difficult. The parts of the present valves furthermore have not been readily interchangeable, and grinding and lapping of the valves have often been required to fit the same. Furthermore, variations in the bleeder grooves, due to their difficulty of formation, have caused undesirable variations in the lighting operation as between guns. It is often necessary to allow an axial wear allowance where lapping was required for maintenance, which complicates the hole alignment problem.

One object of this invention is a new, simplified and more reliable plug valve construction for a flame spray gun which eliminates many of the problems of the prior plug valves used.

This and still further objects will become apparent from the following description read in conjunction with the drawings in which:

FIG. 1 is a side elevation showing an embodiment of a powder type spray gun provided with an embodiment of a plug valve in accordance with the invention;

FIG. 4 is a perspective front view of the valve shown in FIG. 1 removed from the gun; and FIG. 5 is a plan view in section of the embodiment shown in the previous figures.

Figure 2:
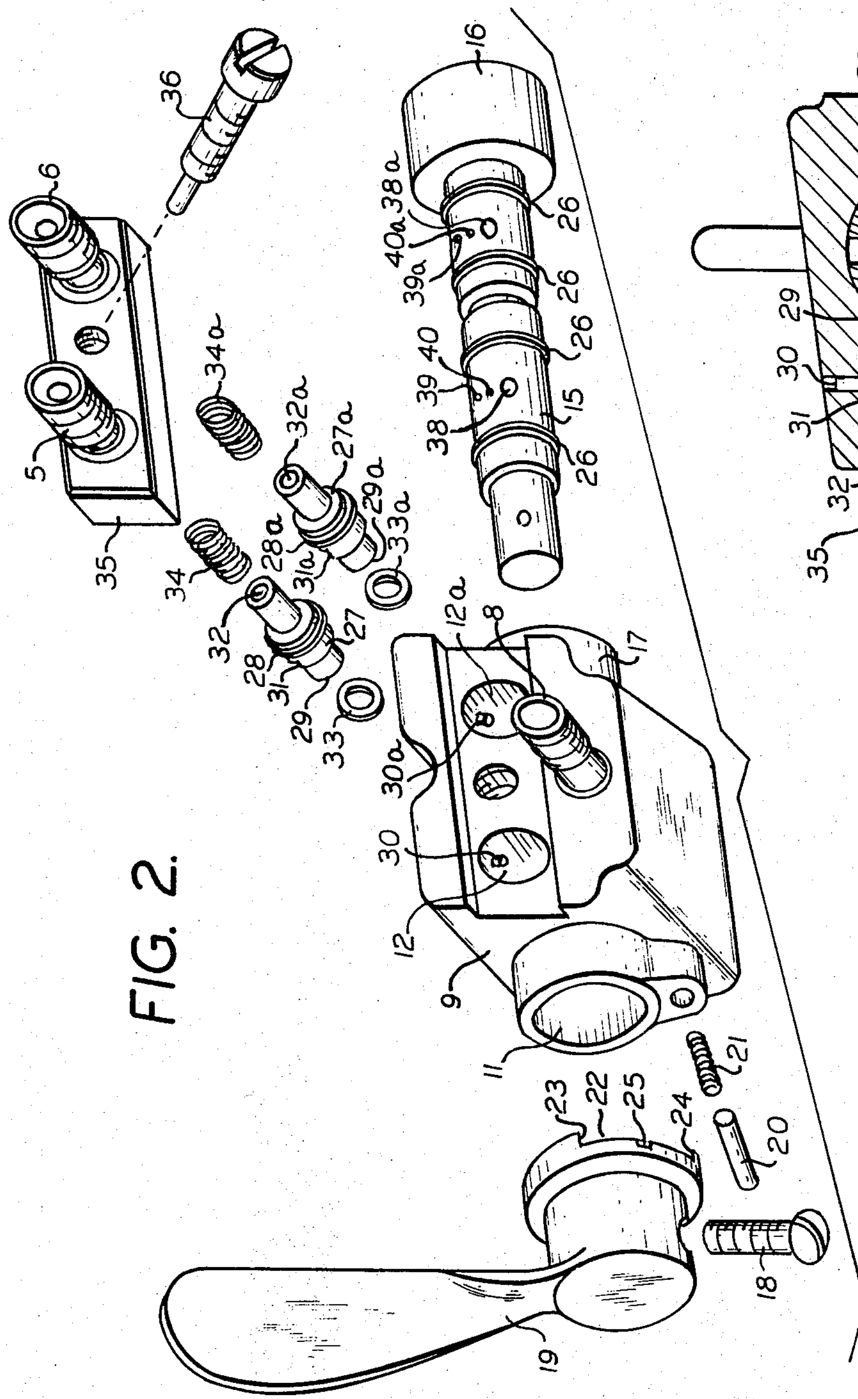
FIG. 2 is an exploded perspective view of the plug valve shown in FIG. 1.

The plug valve in accordance with the invention has a housing provided with a cylindrical bore in which a cylindrical valve core member is rotatably fitted and preferably sealed by means of O-ring seals. At least one gas flow passage extends through the housing intersecting the cylindrical bore transverse thereto. Preferably a multiple number of gas flow passages are provided side by side, one for each of the gases to be controlled, such as the fuel gas, oxidizing gas and possibly blast gas. The construction as hereinafter described is provided for each of these passages. The passage has an inlet end on one side of the cylindrical bore and an outlet end on the opposite side of the bore. A plunger is positioned for limited axial movement in the inlet end of the passage, and a sliding gas-tight seal, such as an O-ring seal, is provided between the outer wall of the plunger and the inner wall of the passage. A bore extends through the plunger forming a part of the gas flow passage, and a seal such as an O-ring seal surrounds the plunger bore adjacent the valve core. Means such as a spring resiliently urge the plunger toward the valve core to press the seal, such as the O-ring seal, in sealing contact with the core without inhibiting rotation of the valve core. A primary gas flow orifice extends through the valve core communicating the inlet and outlet ends of the gas flow passage in one position of rotation of the valve core, and at least one, and possibly more, secondary smaller bleed orifices communicate the inlet and outlet ends of the gas flow passage in a different position of rotation of the valve core. The orifices are so positioned with respect to each other that they will establish continuous gas flow communication therethrough from the inlet end to the outlet end of the gas flow passage as the valve core is rotated from its position registering the secondary gas flow orifice with the passage to the position registering the inlet end of the gas flow passage with the primary flow orifice. The valve core is furthermore rotatable to a position blocking gas flow communication, *i.e.*, a shut-off position.

Referring to the embodiment shown in the drawings, 1 represents a conventional flame spray gun of the powder type, as for example described in U.S. Pat. No. 2,961,335 of Nov. 22, 1960. The gun is provided with a cylindrical plug valve generally designated 2 in accordance with the invention. A fuel gas line, such as an acetylene line 4, and an oxidizing gas line, such as an oxygen line 3, lead to the gas hose connections 5 and 6 provided at the rear of the valve. A further air line 7 leads to the connection 8 at the rear of the valve. Connection 8 leads into a straight flow passage through the housing 9 of the valve, without being controlled by the valve. Except for the valve, the construction and operation of the gun per se is as described in the above patent. The valve housing which is preferably constructed of metal such as aluminum, is provided with the cylindrical bore 11 extending therethrough. A gas flow passage 12 extends through the housing intersecting the bore 11 transverse thereto. A further gas flow passage **12*a* also extends in the identical manner through the housing, the gas flow passage 12 being for fuel gas and the passage 12*a*** being for the oxygen or other oxidizing gas.

As hereinafter described, the construction and operation of the various elements and components will be described in detail with respect to the fuel gas passage 12, it being understood, however, that the identical construction and operation are applicable with respect to the oxidizing gas passage, the elements of which will be designated by corresponding numerals followed by *a*. It is furthermore understood additional identical passage elements may be provided for additional gas control, as for example for blast gas control as is conventionally used with a wire type gun.

The passage 12 has an inlet end 13 and an outlet end 14, with the inlet end being on one side of the bore 11 and the outlet end on the opposite side of the bore 11. A cylindrical valve core 15 is rotatably fitted in the bore 11. One end of the valve core is provided with cylindrical nob 16 which seats against the bearing surface 17 in the housing. Connected on the other end of the cylindrical valve core by means of the screw 18 is the handle 19. The detent 20, spring-loaded by the spring 21, limits the rotation of the handle 19 and thus the cylindrical valve core member 15. The degree of rotation is limited by the shoulders 23 and 24, and an intermediate click position for lighting is provided by the indent 25. The cylindrical valve core is provided with O-ring seals 26 which prevent any lateral gas leakage past them. A plunger 27 is slidably fitted in the inlet end 13 of the gas flow passage 12. The plunger is provided with the O-ring seal 28, which provides a sliding, gas-tight seal between its outer wall and the inner wall of the inlet end of the gas flow passage 13. The forward end of the plunger is provided with a curved surface 29 which corresponds and substantially mates with the curvature of the outer surface of the cylinder valve member 15. The correct position of the plunger and prevention of its rotation out of position is insured by the pin 30 which rides in the slot 31 in the plunger. The plunger is provided with a central bore 32 which forms a part of the gas flow passage. An O-ring seal 33 is positioned at the end of the plunger around the passage 32, and the plunger is axially urged toward the valve member 15 by means of the spring 34 so as to insure a gas-tight sealing of the end of the passage 32 against the valve member 15, irrespective of the position of rotation of the valve member. The spring 34 is compressed in place by means of the connection head 35, which is provided with the gas hose connections 5 and 6. The head 35 is screwed in place against the rear face of the housing 9 by means of the screw 36 and an O-ring 37 surrounding the central bore of the fitting 5 is compressed between the head 35 and rear face of the housing 9.

Figure 3:
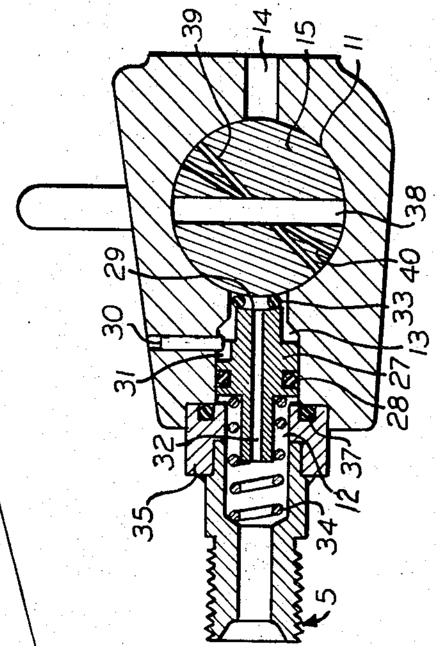
FIG. 3 is a vertical section of the plug valve shown in FIGS. 1 and 2.

The valve member 15 is provided with a primary gas flow orifice 38 and two smaller bleed orifices 39 and 40. These orifices are so positioned that in various positions of rotation they can be aligned and registered to form a connection between the passage 32 and the passage 14. The bleed orifice 39 extends at an angle of about 45° to the primary orifice 38 and the bleed orifice 40 is positioned therebetween. The positioning is such that as the valve member 15 (see FIG. 3) is rotated in a clockwise direction from the shut position as shown, the orifice 39 registers with the passage 32 and communicates it with the outlet end 14 of the main gas flow passage 12. As the valve member 15 is further rotated, the bleed orifice 40 will establish this connection before the orifice 39 is rotated completely out of the alignment position. The primary orifice 38 will then be rotated into registry, communicating 32 and 14 before the orifice 40 is masked. Thus, after the orifice 39 has been rotated into registry, flow communication between 32 and 14 is not interrupted throughout further rotation to the position where the primary orifice 38 is registered.

In operation, the fuel line 4 is connected to the connection 5 and supplied with fuel gas under pressure. With the valve member 15 in the position as shown in drawings 1, 3, 4 and 5 which corresponds to the shut-off position, the passage 32 is sealed, the O-ring 33 being pressed against an imperforate portion of the valve member 15. For lighting, the valve member is initially rotated counter-clockwise by moving the handle 19 forward so that the main orifice 38 registers with, and forms a continuation of, the bore 32 to the outlet end 14. This establishes full gas flow through the gun for purging. The handle is then moved back to the intermediate position, as indicated by the detent 20 clicking in the indent 25. In this position, the bleed orifice 39 is registered with the bore 32 and end 14, establishing a restricted gas flow for lighting. After the gun is lit in the conventional manner, as for example, with a spark igniter, the handle 19 is then moved forward to the degree of rotation allowed by the detent 20, establishing alignment between the main orifice 38, the bore 32 and outlet end 14, allowing full gas flow for operation.

As the valve member 15 rotates from the position in which the bleed orifice 39 is aligned with the bore 32 and outlet end 14 to the position in which the main orifice 38 is so aligned, the bleed orifice 40 will pass through registry preventing interruption of the gas flow and thus extinguishment of the flame. At the same time corresponding gas flow positions are established for the oxygen passing from the line 3 into the connection 6, and the bleed orifices 39 and **39*a*** may be dimensioned with respect to each other to provide an optimum mixture for lighting, as for example by utilizing a fuel-rich mixture. If a blast gas passage is also controlled by the valve, the optimum blast gas flow for lighting may also be established in this manner. In all respects, the operation of the flame spray gun is as described in U.S. Pat. No. 2,961,335.

The valve construction in accordance with the invention is extremely reliable, practically never requiring service. When service is required, the same may be effected by simply replacing the O-rings without the necessity of any grinding or lapping of valves. The step for lighting as provided by the bleed orifices 39, 40 is positive and accurate and eliminates the prior art variations in lighting which occurred between guns. The valve is extremely easy to turn, does not stiffen up and does not tend to bind. The valve may furthermore be constructed much more cheaply, with looser tolerances, and parts may be made interchangeable among valves. No axial wear allowance for lapping is required and there is thus no hole alignment problem. The bleeding orifices may be inserted in the valve member by a straightforward machine operation, utilizing for example a drill press and jig.

While the invention has been described in detail with reference to certain specific embodiments, various changes and modifications which fall within the spirit of the invention will become apparent to the skilled artisan.

We claim:

1. A plug valve for controlling gas flow through a flame spray gun comprising a valve housing, a cylindrical bore extending into said housing, a gas flow passage extending through said housing intersecting said bore transverse thereto and having an inlet end on one side of said bore and an outlet end on the opposite side of said bore, a cylindrical valve core rotatably fitted in said bore, a plunger axially movable in the inlet end of said gas flow passage, a sliding gas-tight seal between the outer wall of said plunger and the inner wall of said gas flow passage, a bore extending through said plunger forming a part of said gas flow passage, a seal surrounding said bore adjacent said valve core, means resiliently biasing said plunger toward said valve core to press said seal in sealing contact with said valve core, a primary cylindrical flow orifice of substantially uniform diameter extending through said valve core communicating the inlet and outlet ends of said gas flow passage in one position of rotation of said valve core, at least one second smaller cylindrical bleed orifice of substantially uniform diameter extending through said valve core communicating the inlet and outlet ends of said gas flow passage in a different position of rotation of said valve core, and at least one-third cylindrical bleed orifice of substantially uniform diameter extending through said valve core between said primary and secondary orifices, said gas flow orifices being positioned with respect to each other to establish continuous gas flow communication therethrough from said inlet end to said outlet end of said gas flow passage as said valve core is rotated from a position registering the gas inlet end of said gas flow passage with said second gas flow orifice to a position registering the inlet end of said gas flow passage with said primary gas flow orifice, said valve core being furthermore rotatable to a position blocking gas flow communication through said gas flow passage, whereby said valve core may be rotated from said blocking position through the positions registering said secondary and primary gas flow orifices respectively.

2. A plug valve according to claim 1 in which said secondary gas flow orifice extends at an angle of about 45° to said primary orifice.

3. A plug valve according to claim 2 including O-ring seals surrounding said core at either side of said orifices.

4. A plug valve according to claim 3 in which said sliding gas-tight seal and said seal surrounding said bore are O-ring seals.

5. A plug valve according to claim 4 in which said housing has at least two gas flow passages positioned side by side extending through said housing intersecting said bore transverse thereto and in which the valve is provided with corresponding plungers, sliding gas-tight seals, seals surrounding the bores, means resiliently biasing the plungers, primary flow orifice, second smaller bleed orifices, and third bleed orifices for each gas flow passage.

6. A plug valve according to claim 1 in which said housing has at least two gas flow passages positioned side by side extending through said housing intersecting said bore transverse thereto and in which the valve is provided with corresponding plungers, sliding gas-tight seals, seals surrounding the bores, means resiliently biasing the plungers, primary flow orifice, second smaller bleed orifices, and third bleed orifices for each gas flow passage.

7. A plug valve according to claim 6 including O-ring seals surrounding said valve member between each flow passage.

8. A plug valve according to claim 7 in which said second gas flow orifices extend at an angle of about 45° to said primary orifices and including a handle for rotating said valve member, means limiting the degree of rotation of said valve member about 90° and detent means indicating the intermediate position of rotation of said valve member.

9. A plug valve according to claim 8 in which the ends of said plungers adjacent said valve member have a concave curvature corresponding to the curvature of said valve member.

10. A plug valve according to claim 1 in which the forward end of said plunger has a concave curvature corresponding to the curvature of said valve member and including means for maintaining said plunger aligned so that its concave curvature is maintained in alignment with the curvature of said valve member.